United States Patent [19]

Holtorf

[11] Patent Number: 5,445,302
[45] Date of Patent: Aug. 29, 1995

[54] PET PACK

[76] Inventor: Karol Mae V. Holtorf, 621 N. Bishop, San Angelo, Tex. 76901

[21] Appl. No.: 323,766

[22] Filed: Oct. 17, 1994

[51] Int. Cl.6 .............................................. A45F 3/04
[52] U.S. Cl. .................... 224/209; 224/214; 224/161; 119/17
[58] Field of Search ............... 224/921, 158, 159, 160, 224/161, 209, 210, 211, 212, 213, 214, 215, 259, 260, 261, 262, 263, 42.32, 42.43, 42.03 R, 42.07, 32 R, 151, 153; 119/17

[56] References Cited

U.S. PATENT DOCUMENTS

| | | | |
|---|---|---|---|
| 3,791,347 | 2/1974 | Lovell | 119/17 |
| 3,834,352 | 9/1974 | Gervis | 119/17 |
| 4,883,207 | 11/1989 | McArthur | 224/210 |
| 4,921,103 | 5/1990 | Cohen | 224/209 |
| 4,989,744 | 2/1991 | Tominaga | 119/17 |
| 5,044,321 | 9/1991 | Selph | 224/160 |

FOREIGN PATENT DOCUMENTS

| | | | |
|---|---|---|---|
| 163241 | 10/1948 | Austria | 224/161 |
| 2613415 | 12/1977 | Germany | 224/209 |

*Primary Examiner*—Henry J. Recla
*Assistant Examiner*—Gregory M. Vidovich

[57] ABSTRACT

A new and improved pet pack with a rectangular compartment having an open top, a closed bottom, two side walls, a rear wall, and an open front. A plastic grid is secured to the open front. A lid is hingedly secured to a back portion of the open top of the rectangular compartment. Two adjustable shoulder straps, each is secured to the rear wall of the rectangular compartment. An adjustment device is secured to the two shoulder straps.

3 Claims, 4 Drawing Sheets

PET PACK

BACKGROUND OF THE INVENTION

1. Field of the Invention

The present invention relates to a pet pack and more particularly pertains to providing a back-pack style carrier for domestic animals such as cats with a pet pack.

2. Description of the Prior Art

The use of backpack carriers is known in the prior art. More specifically, backpack carriers heretofore devised and utilized for the purpose of carrying objects are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,610,489 to Parsons discloses an infant carrier for back pack frame.

U.S. Pat. No. 3,648,907 to Romney discloses a back pack carrier system.

U.S. Pat. No. 4,746,044 to Arvizu discloses a backpack with stand and detachable child carrier.

U.S. Pat. No. 3,549,064 to Wilson discloses a back pack tool box.

U.S. Pat. No. Des. 304,879 to Mitchell discloses the ornamental design for a backpack grocery carrier.

While these devices fulfill their respective, particular objective and requirements, the aforementioned patents do not describe a pet pack for providing a back-pack style carrier for domestic animals such as cats.

In this respect, the pet pack according to the present invention substantially departs from the conventional concepts and designs of the prior art, and in doing so provides an apparatus primarily developed for the purpose of providing a back-pack style carrier for reptiles and animals such as cats.

Therefore, it can be appreciated that there exists a continuing need for a new and improved pet pack which can be used for providing a back-pack style carrier for domestic animals such as cats. In this regard, the present invention substantially fulfills this need.

SUMMARY OF THE INVENTION

In the view of the foregoing disadvantages inherent in the known types of backpack carriers now present in the prior art, the present invention provides an improved pet pack. As such, the general purpose of the present invention, which will be described subsequently in greater detail, is to provide a new and improved pet pack and method which has all the advantages of the prior art and none of the disadvantages.

To attain this, the present invention essentially comprises a rectangular compartment having an open top, a closed bottom, two side walls, a rear wall, and an open front. A plastic grid is secured to the open front. An aperture is formed in an upper corner of each of the two side walls adjacent the open front. A support bar is secured across the open front and over the plastic grid. The device contains a lid having a front end, a back end, and two side walls. The back end is hingedly secured to a back portion of the open top of the rectangular compartment. A hook is secured to each of the two side walls adjacent the front end. The hooks cooperate with each aperture formed in the upper corner of the two side walls of the rectangular compartment. The device contains two adjustable shoulder straps. Each of the two adjustable shoulder straps have a first end and a second end. The first end is secured to the rear wall of the rectangular compartment. The second end is secured to the rear wall of the rectangular compartment downwardly of the first end. An adjustment means is secured to the two shoulder straps inward of each first end. The device contains an H-shaped support strap having a first support end, a second support end, and a middle support therebetween. A fastening means is secured to the H-shaped support strap inward of the first support end. The first end slips under and over the plastic grid of the rectangular compartment and secured thereto. The second support end is secured to the rear end of the rectangular compartment. The device contains a rear compartment cover that is removably secured to the rear end of the rectangular compartment. The cover overlaps each first end and second end of the two shoulder straps and the second support end of the H-shaped support strap.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pet pack which has all the advantages of the prior art backpack carriers and none of the disadvantages.

It is another object of the present invention to provide a new and improved pet pack which may be easily and efficiently manufactured and marketed.

It is a further object of the present invention to provide a new and improved pet pack which is of durable and reliable construction.

An even further object of the present invention is to provide a new and improved pet pack which is susceptible of a low cost of manufacture with regard to both materials and labor, and which accordingly is then susceptible of low prices of sale to the consuming public, thereby making such a pet pack economically available to the buying public.

Still yet another object of the present invention is to provide a new and improved pet pack which provides in the apparatuses and methods of the prior art some of the advantages thereof, while simultaneously overcoming some of the disadvantages normally associated therewith.

Even still another object of the present invention is to provide a new and improved pet pack for providing a back-pack style carrier for domestic animals such as cats.

Lastly, it is an object of the present invention to provide a new and improved pet pack with a rectangular compartment having an open top, a closed bottom, two side walls, a rear wall, and an open front. A plastic grid is secured to the open front. A lid is hingedly secured to a back portion of the open top of the rectangular compartment. Two adjustable shoulder straps, each is secured to the rear wall of the rectangular compartment. An adjustment means is secured to the two shoulder straps.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
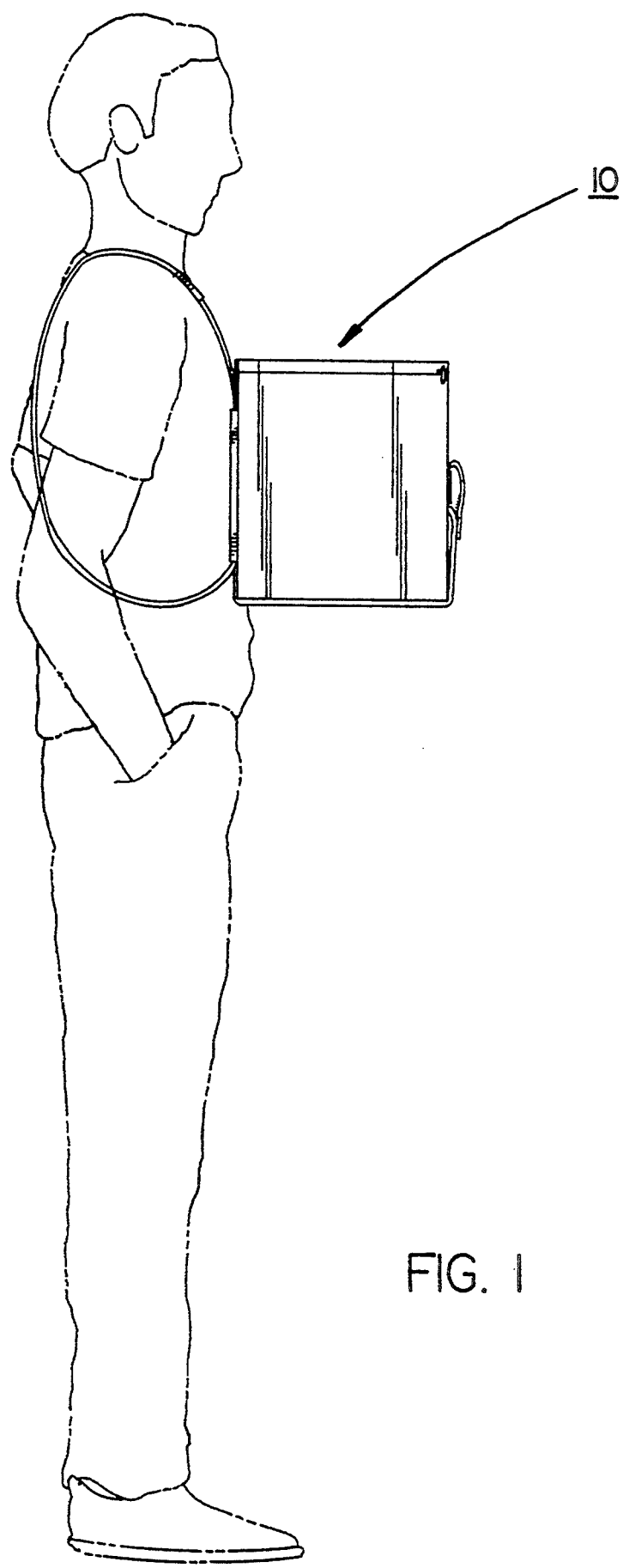
FIG. 1 is a side view of the present invention illustrated in place on a user.
Figure 2:
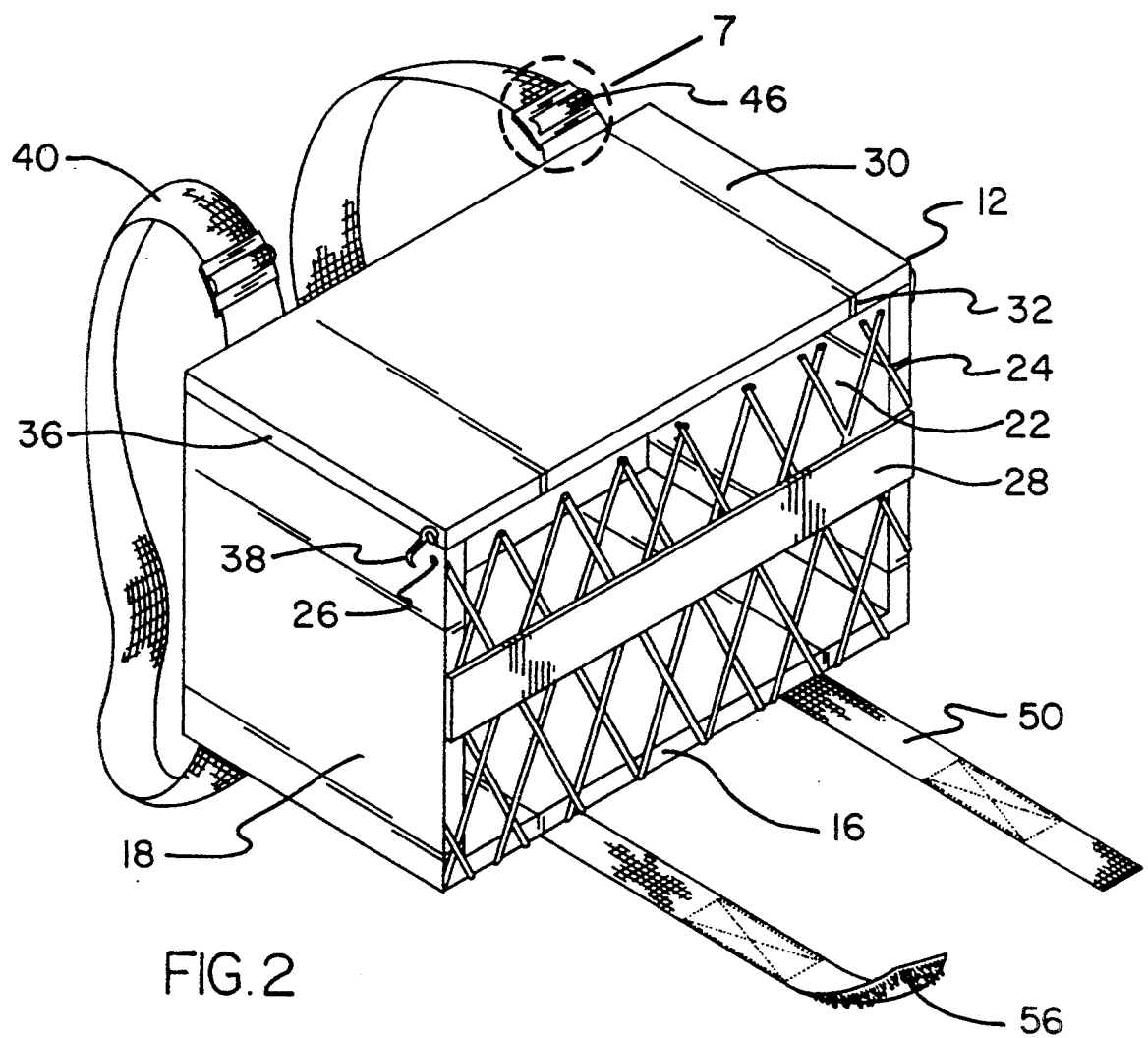
FIG. 2 is a perspective view of the preferred embodiment of the pet pack constructed in accordance with the principles of the present invention.
Figure 3:
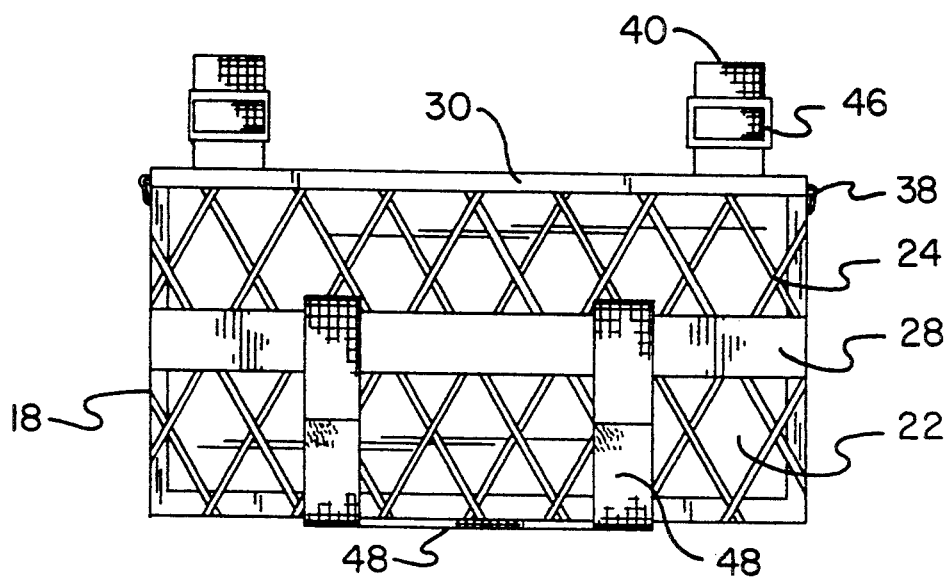
FIG. 3 is a front view of present invention illustrating the hook and loop fastener straps.
Figure 4:
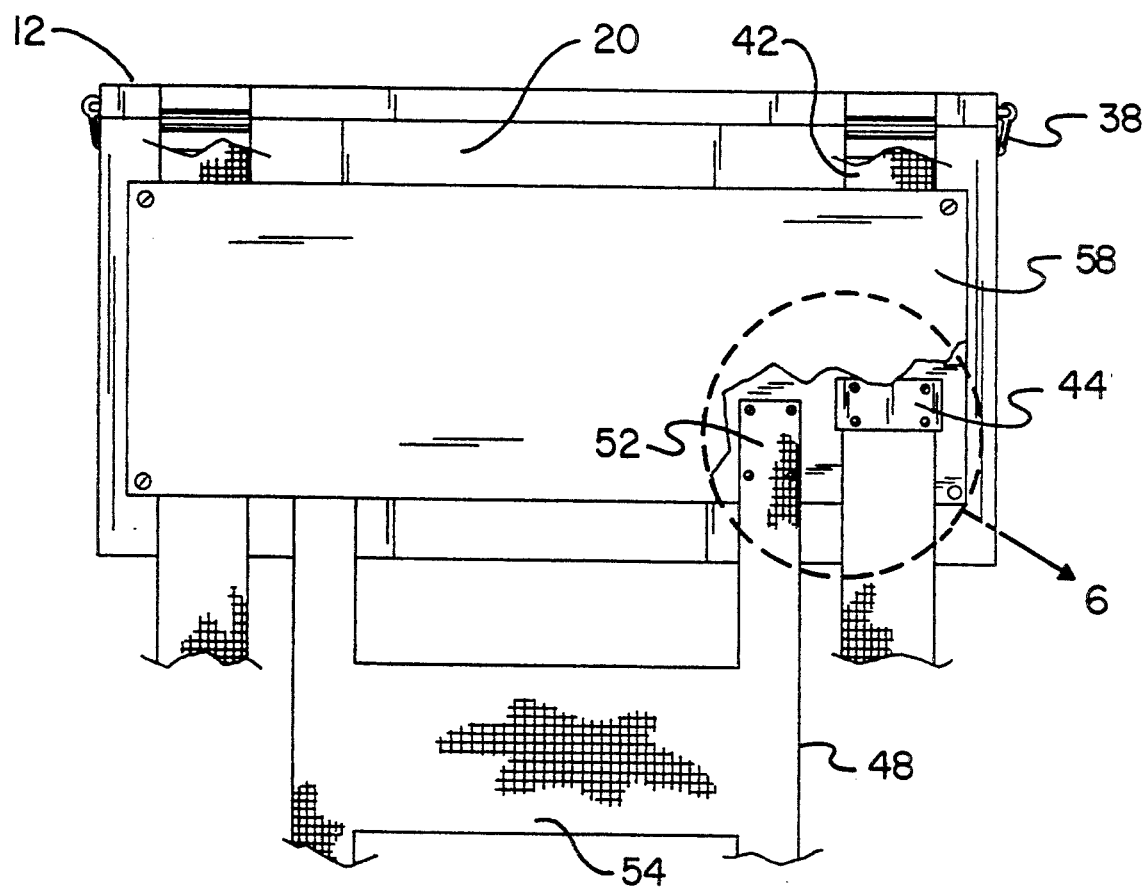
FIG. 4 is a rear view of the present invention illustrating the strap securement.
Figure 5:
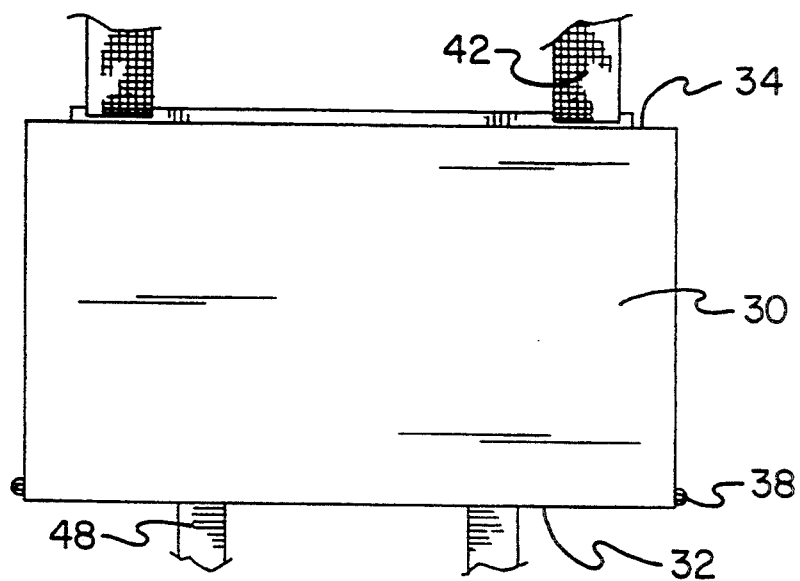
FIG. 5 is a plan view of the present invention illustrating the cover.
Figure 6:
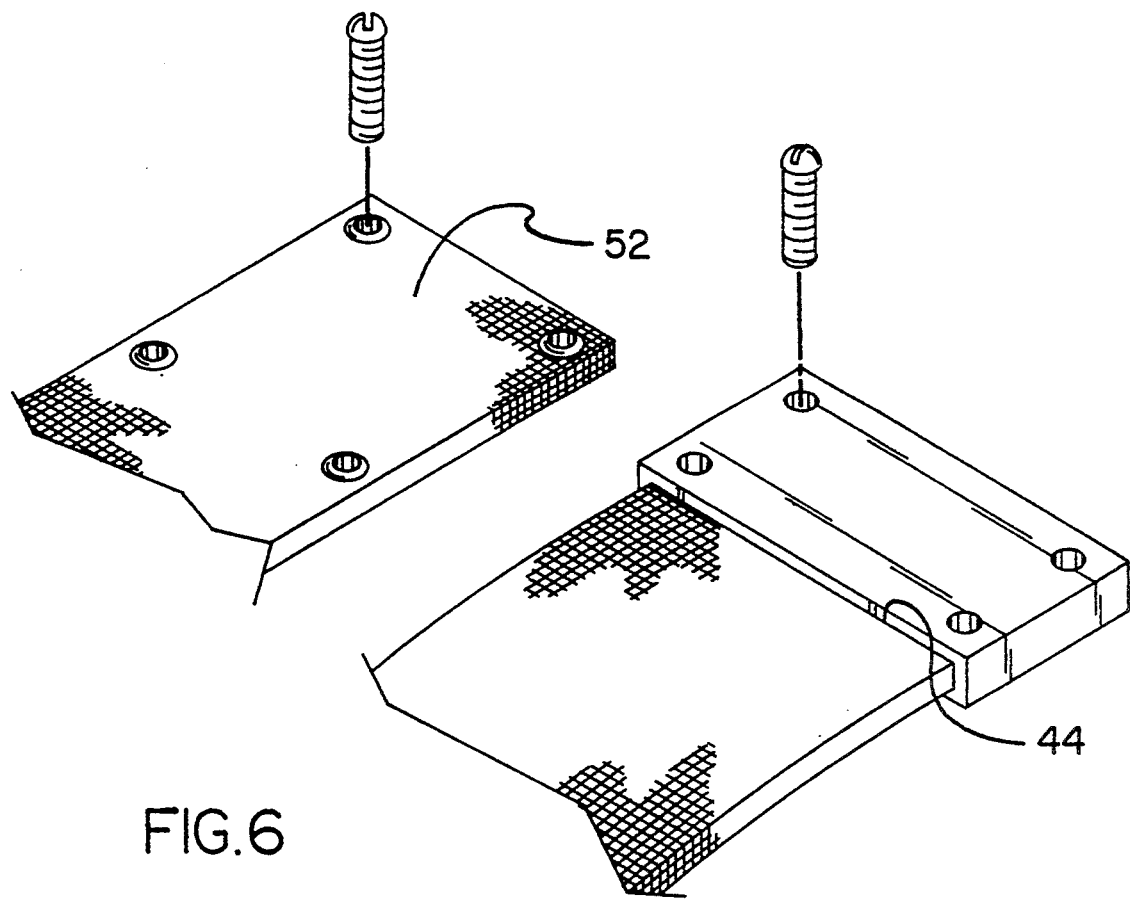
FIG. 6 is an enlarged perspective view of the strap securement.
Figure 7:
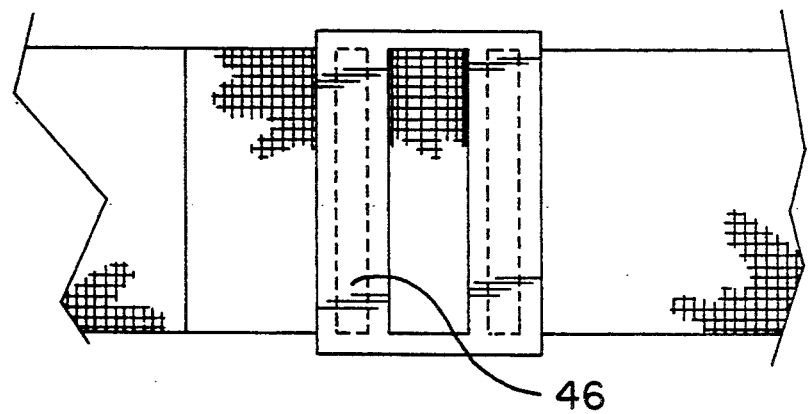
FIG. 7 is an enlarged view of the adjustment capability of the fastener straps.

With reference now to the drawings, and in particular, to FIG. 1 thereof, the preferred embodiment of the new and improved pet pack embodying the principles and concepts of the present invention and generally designated by the reference number 10 will be described.

Specifically, it will be noted in the various Figures that the device relates to a new and improved pet pack for providing a back-pack style carrier for domestic animals such as cats. In its broadest context, the device consists of a rectangular compartment, a lid, two adjustable shoulder straps, an H-shaped support strap, and a rear compartment cover.

The device 10 contains a rectangular compartment 12 having an open top 14, a closed bottom 16, two side walls 18, a rear wall 20, and an open front 22. A plastic grid 24 is secured to the open front 20. The plastic grid prevents the animal from exiting out of the open front 22 and also provides ventilation and a means for the animal to view out of the compartment 12. An aperture 26 is formed in an upper corner of each of the two side walls 18 adjacent the open front 20. A support bar 28 is secured across the open front 22 and over the plastic grid 24.

The device 10 contains a lid 30 having a front end 32, a back end 34, and two side walls 36. The back end 34 is hingedly secured to a back portion of the open top 14 of the rectangular compartment 12. A hook 38 is secured to each of the two side walls 36 adjacent the front end 32. The hooks 38 cooperate with each aperture 26 formed in the upper corner of the two side walls 18 of the rectangular compartment 12. The lid 30 allows the user easy access to the animal that is being carried inside of the rectangular compartment 12 to either comfort or remove the animal. The hooks 38 locks inside of the aperture 26 to prevent the animal from escaping out of the rectangular compartment 12.

The device 10 contains two adjustable shoulder straps 40. Each of the two adjustable shoulder straps 40 have a first end 42 and a second end 44. The first end 42 is secured to the rear wall 20 of the rectangular compartment 12. The second end 44 is secured to the rear wall 20 of the rectangular compartment 12 downwardly of the first end 42. An adjustment means 46 is secured to the two shoulder straps 40 inward of each first end 42. The adjustable straps are securable over a user's shoulders to carry the rectangular compartment 12. The user can position the compartment 12 on their chest or on their back. The adjustment means allows a user to firmly secure the device 10 to their shoulders.

The device 10 contains an H-shaped support strap 48 having a first support end 50, a second support end 52, and a middle support 54 therebetween. A fastening means 56 is secured to the H-shaped support strap 48 inward of the first support end 50. The first end 50 slips under and over the support bar 28 of the rectangular compartment 12 and secured thereto. The second support end 52 is secured to the rear wall 20 of the rectangular compartment 12.

The device 10 contains a rear compartment cover 58 that is removably secured to the rear wall 20 of the rectangular compartment 12. The cover 58 overlaps each first end 42 and second end 44 of the two shoulder straps 40 and the second support end 52 of the H-shaped support strap 48. The rear compartment cover 58 is an optional addition to the device 10 that protects the shoulder straps and the H-shaped support strap.

The present invention is a backpack-style carrier for domestic animals such as cats, small to medium sized dogs, rabbits, etc. It allows the user to carry the pet while keeping both hands free.

The unit consists of a rectangular plastic compartment for the pet that is secured to two shoulder straps. The user slips the straps over the shoulders; the compartment can be carried in either the front or the back. The compartment features a plastic grid front with a support bar extending horizontally across the middle of the grid. There is a hinged top secured by hook and loop fastener straps that slips under and over the support bar. Also, an H-shaped nylon support piece goes under the compartment. An optional cover is available for the compartment.

The grid front allows the pet to view its surroundings, but the cover can be used if the surroundings would upset the animal. The. flip-up top allows easy access to the animal to comfort and pet if necessary. Carrying the pet in this way enables the pet and owner to travel in areas that forbid pets on leashes or wandering free. Also, it is no longer necessary to resort to cumbersome conventional pet carriers that tire out the user's arms and bump against the legs.

The grid front allows efficient air circulation for the pet. The product is durable, convenient, and should be good for both the pet and owner.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A new and improved pet pack for providing a back-pack style carrier for domestic animals comprising, in combination:
    a rectangular compartment having an open top, a closed bottom, two side walls, a rear wall, and an open front, a plastic grid secured to the open front, an aperture formed in an upper corner of each of the two side walls adjacent the open front, a support bar secured across the open front and over the plastic grid;
    a lid having a front end, a back end, and two side walls, the back end hingedly secured to a back portion of the open top of the rectangular compartment, a hook secured to each of the two side walls adjacent the front end, the hooks cooperating With each aperture formed in the upper corner of the two side walls of the rectangular compartment;
    two adjustable shoulder straps, each of the two adjustable shoulder straps having a first end and a second end, the first end secured to the rear wall of the rectangular compartment, the second end secured to the rear wall of the rectangular compartment downwardly of the first end, an adjustment means for adjusting the lengths of said shoulder straps secured to the two shoulder straps inward of each first end;
    an H-shaped support strap having a first support end, a second support end, and a middle support therebetween, a fastening means secured to the H-shaped support strap inward of the first support end, the first support end slipping under and over the support bar and secured thereto by means of said fastening means, the second support end secured to the rear wall of the rectangular compartment; and
    a rear compartment cover removably secured to the rear wall of the rectangular compartment, the cover overlapping each first end and second end of the two shoulder straps and the second support end of the H-shaped support strap.

2. A new and improved pet pack for providing a back-pack style carrier for domestic animals comprising:
    a rectangular compartment having an open top, a closed bottom, two side walls, a rear wall, and an open front, a plastic grid secured to the open front;
    a lid hingedly secured to a back portion of the open top of the rectangular compartment; and
    two adjustable shoulder straps, each of the two adjustable shoulder straps secured to the rear wall of the rectangular compartment, an adjustment means for adjusting the lengths of said shoulder straps secured to the two shoulder straps, a support bar secured across the open front and over the plastic grid; and an H-shaped support strap having a first support end, a second support end, and a middle support therebetween, a fastening means secured to the H-shaped support strap inward of the first support end, the first support end slipping under and over the support bar and being secured thereto by means of said fastening means and the second support end secured to the rear wall of the rectangular compartment.

3. The device as described in claim 2 and further comprising a rear compartment cover removably secured to the rear wall of the rectangular compartment, the cover overlapping each end of the two shoulder straps and the second support end of the H-shaped support strap.

* * * * *